Dec. 30, 1952 W. B. HERNDON 2,623,411
VARIABLE-SPEED DRIVE MECHANISM
Filed June 1, 1950 3 Sheets-Sheet 1

Inventor
Walter B. Herndon
By
Willits, Helmig & Baillio
Attorneys

Dec. 30, 1952           W. B. HERNDON           2,623,411

VARIABLE-SPEED DRIVE MECHANISM

Filed June 1, 1950           3 Sheets—Sheet 2

Inventor
Walter B. Herndon
By Willits, Helmig & Bailio
Attorneys

Patented Dec. 30, 1952

2,623,411

UNITED STATES PATENT OFFICE 2,623,411

VARIABLE-SPEED DRIVE MECHANISM

Walter B. Herndon, Rochester, Mich., assignor to General Motors Corporation, Detroit, Mich., a corporation of Delaware Application June 1, 1950, Serial No. 165,536

19 Claims. (Cl. 74—730)

This invention relates to combinations of gearing with multiple rotor torque converters wherein there are plural, independently rotatable turbine members separately connected to gear elements of a change speed gear train, for the purpose of obtaining automatic change of drive ratio through the differing velocity characteristics of the turbine members.

The invention discloses a fixed countershaft type of gear train having two input gears each connected to a different turbine member with the output portion of the train connected to the load shaft through automatic and otherwise controllable clutch means.

The useful result of the arrangement is a drive mechanism capable of providing a wide range of speed ratio drive automatically selected by the torque and speed conditions of the torque converter for all speed ratios below direct drive, the drive mechanism including an overrunning clutch for eliminating the drive of the torque converter when its torque-multiplying combination with the gear train is not needed.

The invention specifically embodies a fluid turbine device consisting of four rotors including one impeller driven by a power source, two torque-transmitting rotors, one of which is bladed to rotate at higher speeds than the impeller under initial drive conditions, the other of which is bladed to rotate at lower speeds than the impeller during forward reduction drive following initial drive, and the fourth rotor forming a reaction member held against reverse rotation by means of a one-way brake. The first rotor is arranged to furnish a primary reduction range torque component to a novel gear train, and is connected to a gear element through a one-way clutch. The second driven rotor is adapted to furnish a secondary coupling component to the gear train, and is directly connected to its driven gear element. The fourth rotatable element is positioned intermediate the impeller and second driven rotor, and is adapted for forward rotation but, as stated, is held against reverse rotation by means of a one-way brake, so that it may act as a reaction element under certain conditions of operation. It will, of course, be understood that the impeller, two driven rotors, and reaction element form a toroidal chamber for circulating working fluid, the blades of the various elements being exposed to the circulating fluid.

The gear train embodied in this invention includes a cluster of torque transmitting gears fixedly secured to a common countershaft, one of said countershaft gears being in mesh with a gear driven by the first rotor and the other countershaft gear being in mesh with a second gear driven by the second of the rotors. Torque output from the countershaft is coupled to a load shaft through a forward gear drive or a reverse gear drive train as desired. A clutch is provided whereby the torque flow from the countershaft may be cut off from the final load shaft. An additional clutch is provided whereby the torque converter may be by-passed to establish direct drive between the engine shaft and load shaft.

It is an object of this invention to provide in the above stated drive system a primary forward reduction drive through the torque-delivery action of the first driven rotor and a countershaft effective to rotate the second driven rotor during initial drive conditions, and a secondary reduction drive through the torque-delivery action of the second driven rotor and the countershaft, the first driven rotor being coupled to the countershaft by means of a one-way clutch effective to disconnect the first driven rotor from the countershaft during torque delivery by the second driven rotor, whereby the first driven rotor is enabled to rotate freely in the rotor working chamber. This action permits the first driven rotor to offer minimum resistance to the flow of circulating fluid in the rotor working space and is advantageous in that it produces automatic transition from initial low forward drive range to a second speed ratio range.

Other objects and advantages of this invention include the provision of special forms of drive mechanism, in particular the use of one-way clutches in the drive connections of the rotors to certain of the gear elements, and the further use in the combination of a special form of friction clutch having a high torque capacity and adapted to be operated by fluid pressure medium.

Additional objects and advantages of this invention will be apparent from the following description and claims taken in conjunction with the accompanying drawings in which:

Figure 1:
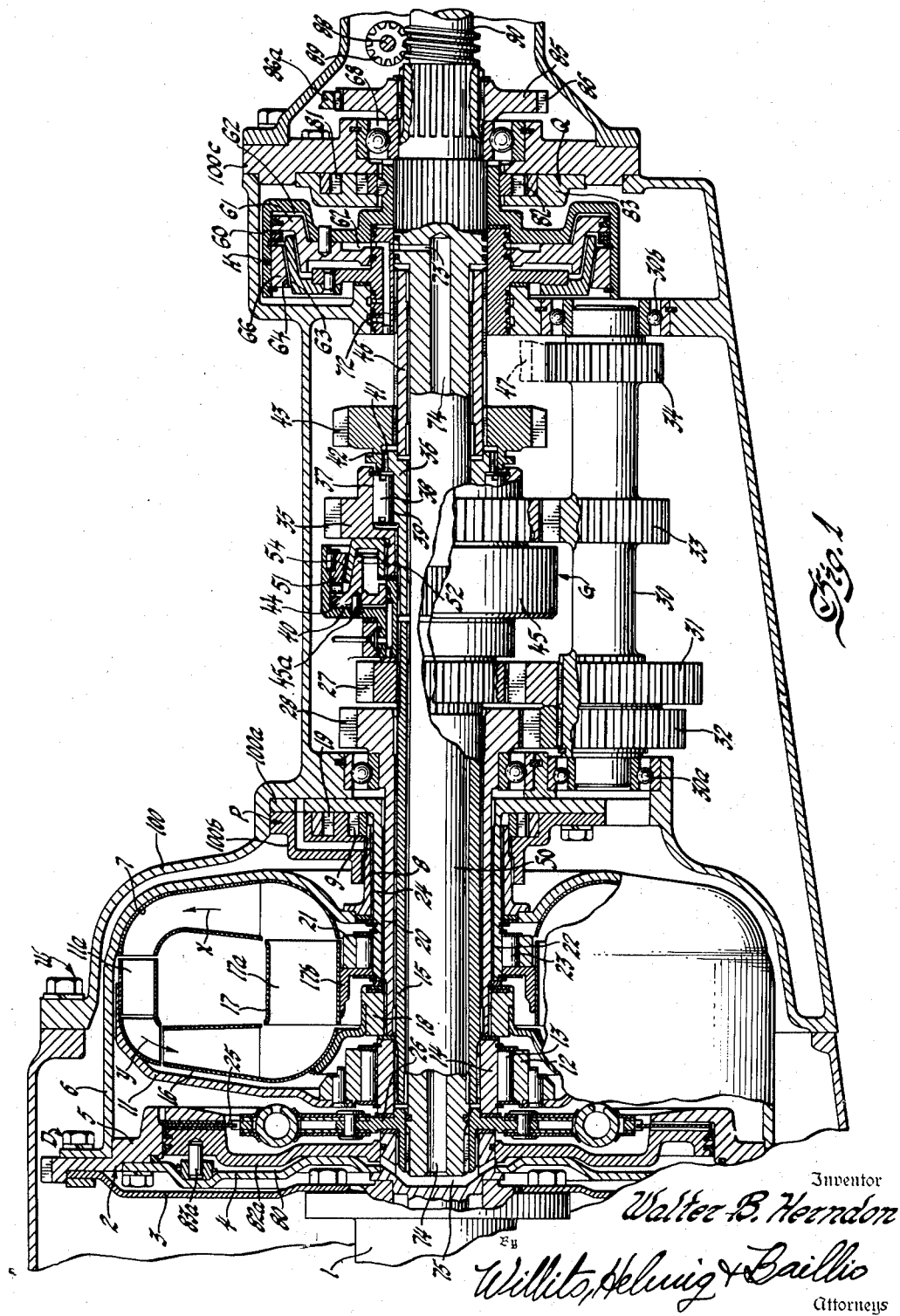
Figure 1 is a vertical section of a transmission assembly constructed in accordance with the principles of this invention.

Referring to Figure 1 there is shown an engine shaft 1 for driving a flywheel structure 2, the latter consisting of a spring plate 3, clutch cylinder plate 4, fitting 5 and a drum 6, the fitting being bolted to both the clutch plate and drum and the spring plate being bolted to the fitting and engine shaft. Drum 6 is attached to and carries an impeller 7 of a fluid torque converter W. A sleeve 8 secured to the hub end of drum 7 is splined to a gear 9 of a servo pump P which provides a source of fluid pressure for actuating fluid servo mechanism hereinafter described.

A first driven turbine rotor member 11 is provided with a plurality of blades 11a which occupy the outer periphery of the converter working chamber to bridge the converter oil outflow and inflow zones designated as x and y. Rotor 11, driven by the fluid body such as oil within the converter acting upon blades 11a, drives a hollow shaft 15 through a one-way clutch composed of members 12 and 14 forming a race for locking elements 13, member 14 being splined to shaft 15 and member 12 being secured to member 11.

A second turbine rotor element 16 occupies the inflow zone of the converter working space except for the extreme inner radial portion where stator 17 bridges the space between the oil inflow and outflow zones. The rotor 16 is carried by a hub 18 splined to hollow turbine shaft 20 having a gear 28 integral with the shaft at one end thereof. Stator 17 is mounted upon a hub 17a and carries passage forming blades 17a for directing fluid from zone y to zone x. The stator 17 is held against backward rotation by means of a one-way brake composed of a ring member 21, member 22, and locking elements 23. Members 21 and 22 are spaced from each other to form a raceway therebetween in which the one-way locking elements are placed. Member 21 is carried by hub 17b fixed to member 17, while member 22 is formed on a sleeve member 24 formed integrally with a housing web portion 100a and fixed against rotation. A pair of pump gears 9—19 are enclosed in a pump chamber formed by web 100a and a second web 100b extending interiorly from housing 100.

An inner load shaft 50 is splined to a clutch hub 26 which, in turn, carries a clutch plate 25. The shaft 50 extends to the right in Figure 1 and forms the output member of the transmission assembly. The hollow shaft 15, intermediate shafts 20 and 50, is keyed to a gear 27 adjacent the right hand end of the shaft. A countershaft 30 carried in bearings 30a and 30b is formed to provide four gear elements 31, 32, 33 and 34. Gears 31 and 32 are placed in constant mesh with gears 27 and 28, respectively, while gears 33 and 34 constitute the low and reverse transfer gears, respectively. A gear body 35 meshing with gear 33 is coupled to a sleeve member 36 by means of a one-way clutch composed of spaced members 37 and 39 having locking elements 38 disposed therebetween, the sleeve member 36 being toothed at 41 to engage internal teeth 42 of a slide gear 43 positioned for axial movement along a sleeve 46.

Figure 2:
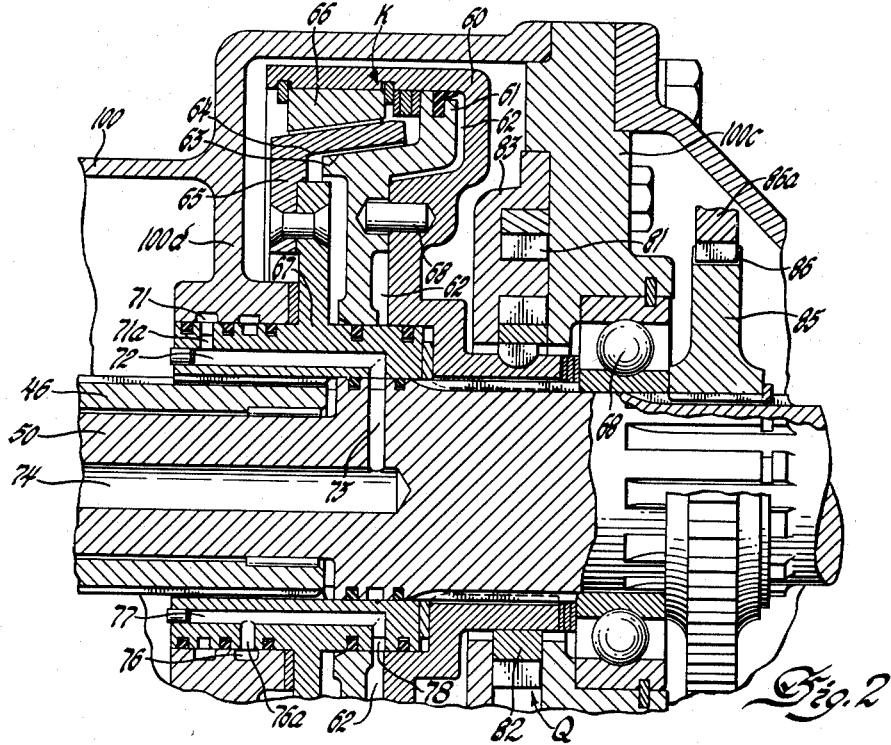
Figure 2 is a similar section of a clutch mechanism for connecting the drive elements at the right of Figure 1 to a load shaft.
Figure 3:
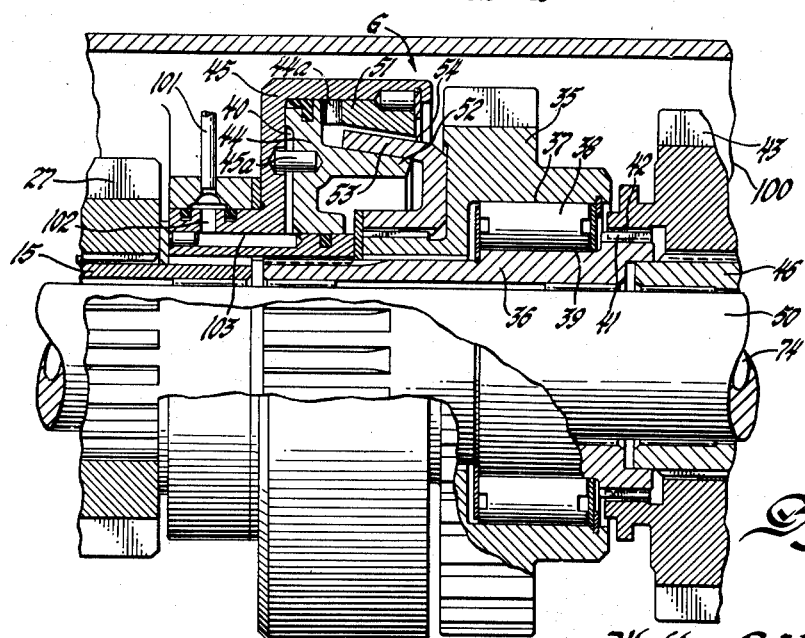
Figure 3 is a detail section of a special clutch construction of the gear train of Figure 1.

As shown in detail in Figure 3, a drum member 45 splined to sleeve 36 forms a cylinder portion 40 adapted to receive a piston 44 positioned for longitudinal motion in the cylinder and pinned to the cylinder by means of a pin 45a. Gear 43 is splined to sleeve 46 and may be moved rearwardly to disengage teeth 41—42 and to mesh with an idler gear 47 meshing with countershaft output gear 34 of Figure 1. Cylinder 40 is provided with a cone ring 51 fastened to the inner peripheral wall of the drum to act as a clutch backing member. A projecting extension 52 on piston 44 is of cone shape externally to mate with an inner conic face of a cone ring 53 splined to gear 35. The outer face 54 of cone ring 53 is of cone shape to engage the inner conic face of ring 51. Fluid pressure in cylinder 40 shifts piston 44 to the right to clutch gear 35 to sleeve 36, which sleeve in turn is connected to gear 43 when the teeth 41—42 are engaged. Sleeve 46 is clutched to shaft 50 by means of a clutch K hereafter described and shown in detail in Figure 2. A spring washer 44a acts to detach the cone surfaces of members 52 and 53 when fluid pressure is released from cylinder 40. Engagement of fluid pressure actuated clutch 51, 52, 53 serves to by-pass the normal effect of one-way clutch 37, 38, 39 so as to provide two-way drive in both low and second speeds. Fluid pressure to cylinder 40 is provided by passage 101, port 102 in the sleeve of drum 45, and passage 103, and is controlled by external valving.

Casing 100 extends to the right, and as shown in detail in Figure 2, contains a rear clutch unit K. Load shaft 50 protrudes from the rear of casing 100 for attachment to the final driven mechanism, and is supported by bearing 68 in web member 100c. A composite clutch drum 60 is splined to shaft 50, the clutch drum being formed internally to provide a cylinder 62 to accommodate a piston 61. Piston 61 is shaped to provide a tapered surface 63 adapted to mate with face 64 of a conic plate 65, plate 65 being mounted upon a hub 67 splined to shaft 46. A backing cone 66 is keyed to the inner cylindrical portion of drum 60. Piston 61 is pinned to drum 60 by means of pin 68.

A passage 71 in casing 100d communicates through port 71a, passages 72, 73, 74 and passage 75, see Fig. 1, to admit fluid pressure to cylinder 80 to cause piston 82 to apply direct drive clutch 25. Passages 76, port 76a, passage 77, and port 78 are provided to admit fluid pressure to cylinder 62 to apply clutch K. As shown in Figure 1, piston 82a is pinned to cylinder plate 4 by means of a pin 83a so that torque may be transmitted from cylinder plate 4 to hub 26 when the clutch 25 is engaged.

A pump Q composed of meshing gears 81 and 82 is supported upon web 100c, being housed between web 100c and a casing member 83 and is driven by the sleeve of drum 60, the sleeve being keyed to gear 82. A splined tooth member 85 splined to shaft 50 rearwardly of bearing 68 serves as a drive gear for a control governor, the teeth 86 of gear 85 being positioned to cooperate with a pawl 86a for locking the gear against rotation to provide a parking brake. Pawl 86a may be manually moved into and out of engagement with gear teeth 86.

*Operation*

During the initial drive, as when the vehicle is first being accelerated, low gear drive is obtained by the multiplied torque of the first turbine or rotor 11 driving shaft 15 through one-way clutch 12—13—14, shaft 15, in turn, driving countershaft 30 through gears 27—31. Power from countershaft 30 is transmitted to sleeve 36 through gears 33 and 35 and one-way clutch 37, 38, 39. The power then flows through teeth 41—42, gear 43 to sleeve 46 and finally to shaft 50 through clutch K when the clutch is engaged. When clutch K is disengaged, no power may be transmitted from the torque converter to load shaft 50 and the transmission is in neutral except when direct drive clutch D is engaged. During the initial drive in low gear, the second turbine or rotor 16 does not receive sufficient torque from the circulatory velocity of the fluid body of the turbine working space to provide drive through sleeve 20 and gears 28—32. Consequently, drive is solely through sleeve 15, gears 27—31 and the train as stated. During this interval, the non-driving gear train 32—28 spins shaft 20 and the second turbine 16 at a speed determined by the ratio of the dimensions of gear trains 27—31 and 32—28. Assuming finite values for the gear diameters of the various gears in the transmission, for example;

| Gear: | Diameter |
|---|---|
| 27 | 20 |
| 28 | 25 |
| 31 | 24 |
| 32 | 19 |
| 33 | 14 |
| 35 | 29 | and the rotation of shaft 15 to be five hundred revolutions per minute, for example, would turn shaft 30 at $\frac{5}{16}$ of this speed or 417 revolutions per minute, and shaft 20 would idle at $\frac{19}{25}$ of this speed or approximately 315 revolutions per minute. The blading of impeller 7 is so designed with respect to the blading of turbines 11 and 16, that it is possible to operate the vehicle in the described overall low gear drive by means of turbine 11 up to a vehicle speed of approximately ten miles per hour at reasonable efficiency, since the gear ratio of approximately 2.48 between shafts 15 and 50 is augmented by the reduction ratio of the torque converter itself, which by design may easily provide a 1.5 further reduction to yield an overall net low drive ratio of approximately 3.72. This overall reduction is comparable with the current practice in the design of the low gear ratio in a conventional three-speed transmission. It should be noted that a fluid torque converter which is inherently capable of very low speed reductions below 3 to 1 is much less efficient than a converter having less reduction ratio. However, by obtaining partial speed reduction through the countershaft, efficient operation is obtained.

Because of the peculiar rotation relationships of rotors 11, 16 and 17, during initial drive the reaction rotor 17 is urged to rotate backward but is held against such rotation by one-way brake 21—22—23. At this time interval rotor 11, through one-way clutch 12—13—14, drives shaft 15 and gear 27 at a primary torque multiplication, the gear train 27—31—33—35 driving shaft 50 at a further torque multiplication. The resulting low gear drive is fully adequate for any inclines, however steep, that may be encountered in operation of the vehicle. Since the gears 32—28 are at this time spinning shaft 20 at a multiple of the speed of shaft 15, rotor 16 is forced to rotate forwardly, for example, at approximately .63 of the speed of rotation of shaft 15. If rotor 16 were braked against rotation, it would provide a stator effect to the flow of circulating fluid and direct the same for entry into the inlet space of impeller 7, but since it is required to rotate forwardly upon rotation of impeller 11, it may be said to act as a forwardly rotating reaction member. Further re-direction of the circulating fluid stream is provided by the blades of member 17 which acts as a stator during the interval when its backward reaction torque component, applied by the circulating fluid, is effective to lock the one-way brake 21—22—23 to thereby prevent backward rotation of the member.

As rotor 11 increases its rotational speed, the circulating velocity of the fluid delivered by impeller 11 falls off until it reaches a given value whereupon the second turbine 16 is overtaken by fluid action and can no longer idle. A coupling torque is developed upon the rotor 16 tending to drive the vehicle through the second speed gear train 28—32. This torque, tending to increase the speed of rotation of countershaft 30 over that applied to the shaft through gear train 27—31, also tends to spin shaft 15 through gear train 31—27 at a ratio inverse to that by which shaft 15 formerly drove shaft 20, or, as in the example cited, at an overspeed of about 1.59. Under the condition of operation, the circulating fluid is unable to rotate turbine rotor 11 at sufficient speed to deliver torque to shaft 15, so that shaft 15 is rotated at greater speed than the turbine 11, the one-way clutch 12—13—14 releasing to uncouple shaft 15 from turbine 11.

Since both torque converter rotors 11 and 16 lie in the circulating fluid stream of the turbine, their respective rotational speeds depends upon load applied (resistance to rotation of shaft 50) and upon the differential speed of each rotor and the impeller. Release action of one-way clutch 12—13—14, however, is controlled by overtaking speed of shaft 15 on one hand and jointly by input torque applied to rotor 11 and rotational speed of rotor 11 on the other hand. Thus, it is found that during the transition interval, both rotors 11 and 16 are momentarily delivering torque, providing an interval of torque overlap. The gradual nature of this action prevents shock on the one-way clutch elements, since the clutch elements not only engage but also release under definite minimum changing torque conditions and are never required to lock or release with one member running completely free.

With one-way clutch 12—13—14 unlocked, drive is in second gear, the overall value of the reduction ratio being determined by the dimensions of the gear train and the blade design of the converter for operation with turbine 16 acting as the sole driving member. This is readily calculated with the example figures given above, the gear reduction ratio being approximately 1.59 and the converter ratio approximately 1.5, yielding a net overall reduction ratio of approximately 1.92 from engine shaft 1 to output shaft 50. This is a very acceptable second speed ratio in present practice. It will readily be understood that the above described operation in low and second driving ranges could continue automatically endlessly without attention of the operation of the vehicle since the drive range, either low or second, is obtained automatically through the drive selection occasioned by the first and second driven rotors as they accept torque from the fluid stream.

On downshift, from second speed range, under load, the load applied to rotor 16 through gears 32—28 and shaft 20 causes the circulating velocity of the fluid in the converter working space to rise to a value capable of imparting torque to rotor 11 sufficient to cause the rotor to overtake shaft 15 and lock one-way clutch 12—13—14, at which time turbine 16 ceases to provide torque and the drive is in low ratio. This normally occurs at low output shaft speed. Under normal overtaking torque in second speed range (due to deceleration of the vehicle at speeds above ten miles per hour in the example given) there is no automatic downshift to low range. If, however, throttle advance occurs at such a period as when the development of impeller-induced fluid flow is in the range where the first driven impeller can deliver torque, drive will be in low range.

A further feature of this transmission is the automatic attainment of a coupled drive ratio by the converter, due to the selected blading of form of the various rotors. At a selected circulating velocity of the turbine fluid, the stator blades 17a no longer receive a directional flow from rotor 16 tending to lock the one-way brake 21—22—23, and the fluid stream impinges on the convex backs of the blades 17a, thereby tending to cause member 17 to rotate forwardly. The torque converter reduction ratio thereafter approaches a one-to-one ratio between the engine shaft 1 and the converter output. Thus, whenever member 17 is caused to rotate forwardly, the torque converter no longer acts as a torque multiplier but, rather, transmits torque in a manner similar to a fluid flywheel. This action may, by design, be caused to occur in first or second speed ranges, or both, but it is preferred that in the present structure the shift to top converter ratio take place only when the turbine rotor 16 is transmitting torque in second speed range.

This invention, therefore, makes it possible for the driver of a vehicle to enjoy fully automatic shift from initial drive through low and second speed ranges up to the gear ratio of the second speed gear train of approximately 1.59 to 1 when the converter ratio is at approximately 1 to 1 without the use of any controls, and solely as a result of the inherent action of the described parts. It is believed that for operation of vehicles under difficult traffic conditions, the invention contributes to smooth, effortless drive control and to public safety.. It reduces the number of controls requiring attention of the operator and by virtue of the inherent overtaking action of the turbines in automatic selection of drive ratio, minimizes the cost as compared with other automatic controls. Another apparent advantage is the unusual smoothness of drive transition accomplished without the use of power or other application of friction elements such as planetary reaction brakes, or of ratio clutches, common in this art.

It is believed novel to utilize the torque characteristics of two independently rotatable converter ratios to obtain torque multiplication in two separate gear trains, and wherein an automatic stator effect and stator release is provided in the torque converter.

Referring further to Figures 1 and 3, the slidable gear 43, may have only three effective positions; a forward position in which teeth 42 engage teeth 41 of sleeve 36, a central neutral position, and a rear position in which the teeth 43 mesh with a reverse idle gear 47. Any suitable means, such as a shift fork (not shown) actuated by a master control adapted to be placed in either a "forward," "neutral," or "reverse" position may be utilized to place the gear 43 in forward, neutral, or reverse condition of operation. Clutch K, heretofore described, is effective at all times when cylinder 62 is exhausted, to provide a positive neutral whereby creep of the vehicle due to rotation of impeller 7 and countershaft 30 may be avoided. Thus, clutch K may be disengaged by lack of fluid pressure when the master control is placed in "neutral" and slider gear 43 may be positioned in forward mesh without danger of vehicle creep. Upon movement of the master control to either "forward" or "reverse" position, external valving of any suitable type (not shown) may be actuated to admit fluid pressure to passage 75 and 76 and to cylinder 62 to move piston 61 to cause conic plate 61 to be gripped by drum 60 to establish drive between shaft 46 and shaft 50.

It will likewise be understood that suitable external valving may be actuated by the master control or by automatically operable valving mechanism to admit fluid pressure to cylinder 80 as shown in Figure 1 to cause piston 82 to grip clutch plate 25 (attached to shaft 50) to the flywheel assembly. With clutch 25 engaged to member 5 of the flywheel assembly, engine torque is applied directly to shaft 50 and sleeve 36 may be driven faster than gear 35, unlocking one-way clutch 37—38—39 so that the gear trains idle without load. Release of the direct drive clutch 25 and resumption of torque transmission by the torque converter automatically establishes the automatic converter combination drive heretofore described. Under overtaking torque, with shaft 50 rotating faster than gear 35, the drive freewheels due to action of one-way clutch 37—38—39, and the release of torque on the converter rotors permits the velocity of the circulating fluid to fall, following which the resumption of drive torque restores the circulating velocity of the working fluid in the converter and automatically sets up drive action of rotors 11 and 16 in accordance with their torque capacity at that velocity.

The recited freewheeling or coasting effect may not be desired under certain driving conditions as, for example, when engine braking assistance is desired in descending a steep grade. Accordingly, means are provided to bypass or block the freewheeling action of one-way clutch 37—38—39. Fluid pressure may be admitted to cylinder space 40 behind piston 44 by means of passages 101, 102 and 103, the passage 101 being connected to suitable external valving which may be actuated by the positioning of the master control to admit pressure to passage 101. Pressure admitted to passage 101 loads the friction faces of conic ring 52 on piston 44 and cone ring 53, thereby gripping sleeve 36 to gear 35 for two-way drive as distinct from the one-way action of clutch 37—38—39. Release of this pressure, as may be accompanied by movement of the master control, re-establishes the freewheeling condition, the springs 44a acting to return piston 44 to the left to disengage the gripping surfaces.

Shift to direct drive through application of clutch 25 is preferably attained by the use of suitable selector valves (not shown) which may be automatically actuated in response to pressure relationships acting upon the valves as may be determined by throttle position and governor pressure, the latter being responsive to speed of rotation of the output shaft 50. The gear 86 of Figure 1 may be used to drive a fluid pressure governor (not shown), the governor being connected by suitable piping to pumps P and Q and to the selector valves. The selector valves, in turn, are connected to the vehicle throttle and to the cylinder 89 for admission of fluid pressure to the cylinder.

A gear 85 on shaft 50 is provided with teeth 86 which may cooperate with a suitable pawl mechanism 86a to provide a positive parking brake for the vehicle.

Figure 4:
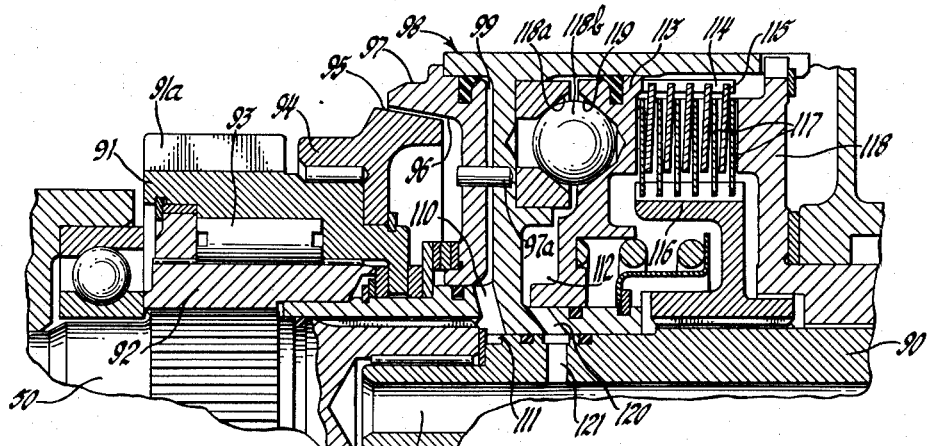
Figure 4 is a partially sectional view of an alternate clutch construction shown in Figure 3, showing a novel torque assist-clutch operator and actuator mechanism.

Referring to Figure 4, there is shown an alternate clutch and shaft arrangement which may be substituted for the mechanism shown in Figure 3. The modification is particularly adapted for coupling a pair of torque output shafts, the shaft 50 being an intermediate shaft driven by the countershaft 30 of Figure 1 in the same manner as shaft 50 of Figure 1. That is to say, intermediate shaft 50 may be driven through the countershaft 30 by either turbines 11 or 16, or may be directly connected to the engine shaft by clutch 25. A final load or torque output shaft 90 is journaled into the end of shaft 50 as shown.

An external gear 91 having teeth 91a is carried by a sleeve 92 splined to shaft 50 with one-way clutch locking members 93 intermediate the sleeve and gear for providing one-way drive of shaft 50 from countershaft 30. Gear 91, in the complete assembly, meshes with gear 33 of the countershaft 30 and is rotated upon rotation of the countershaft to apply torque from the countershaft to shaft 50. An extension 94 fixed to gear 91 is formed with a conical clutch surface 95 facing and adapted to mate with a conical clutch surface 96 formed upon a piston 97, the piston being pinned by a pin 97a to a housing 98 splined to shaft 50 for rotation therewith. The housing is shaped to form a cylinder 99 for receiving piston 97, which cylinder may receive fluid pressure through ports 110 and 111, the latter constituting an annular groove on the periphery of shaft 90 and communicating with an external source of fluid pressure. When fluid pressure is admitted to cylinder 99, clutch 95—96 ties gear 91 directly to housing 98, thereby by-passing the one-way clutch to establish two-way torque transmission between shafts 50 and 90.

A second cylinder 112 formed by housing 98 is adapted to receive a second piston 113, the latter piston including an extension 114 having a plurality of spaced inwardly extending clutch plates 115 keyed thereto. A clutch drum 116 splined to final load shaft 90 carries a plurality of outwardly extending spaced clutch plates 117 disposed adjacent clutch plates 115. An inwardly extending clutch plate backing member 118 is carried by housing 98 for supporting the clutch plates upon movement of piston 113 for clutch engagement. A ball 118b positioned in a diamond shaped ball receiving pocket formed by ball socket 118a and a similar socket 19 formed on piston 113 serves as a torque-assist mechanism as hereafter further explained. While only a single ball is shown, it will be understood that a series of such balls may be spaced around the piston 113. When fluid pressure is first applied to cylinder 112, and at the point of initial engagement of the clutch plates, piston 113 is, or may be, rotating at a speed different from that of clutch drum 116. Due to the relatively different speeds of rotation of these members, a twist is applied to piston 113, which twist, though slight, sets up a reactive force or load on the balls, which balls, in turn, apply the reactive load to the face of the piston adjacent the balls. The reactive load, in turn, is transferred from the balls through the piston so that it is felt on the outer set of plates. In this manner, there is provided a torque-assist structure for engaging the plates whereby a smoother and more positive clutch engagement is achieved and which contributes greatly to increased clutch plate life. Fluid pressure may be admitted to cylinder 112 through ports 120 and 121 communicating with the interior of hollow shaft 90 drilled out at 122.

Suitable valving, not shown, may be used to control the admission and exhaust of fluid pressure to and from cylinders 99 and 112. Clutch 95—96 is normally engaged to disable the action of one-way clutch 91—92—93 whenever engine braking through the torque converter is desired, as in descending steep grades. Clutch plates 115—117 are engaged to provide torque transfer between shafts 50 and 90 and disengaged to provide positive neutral irrespective of whether the drive of shaft 50 is through the countershaft or directly from the engine as is the case when clutch 25 of Figure 1 is engaged.

Figure 5:
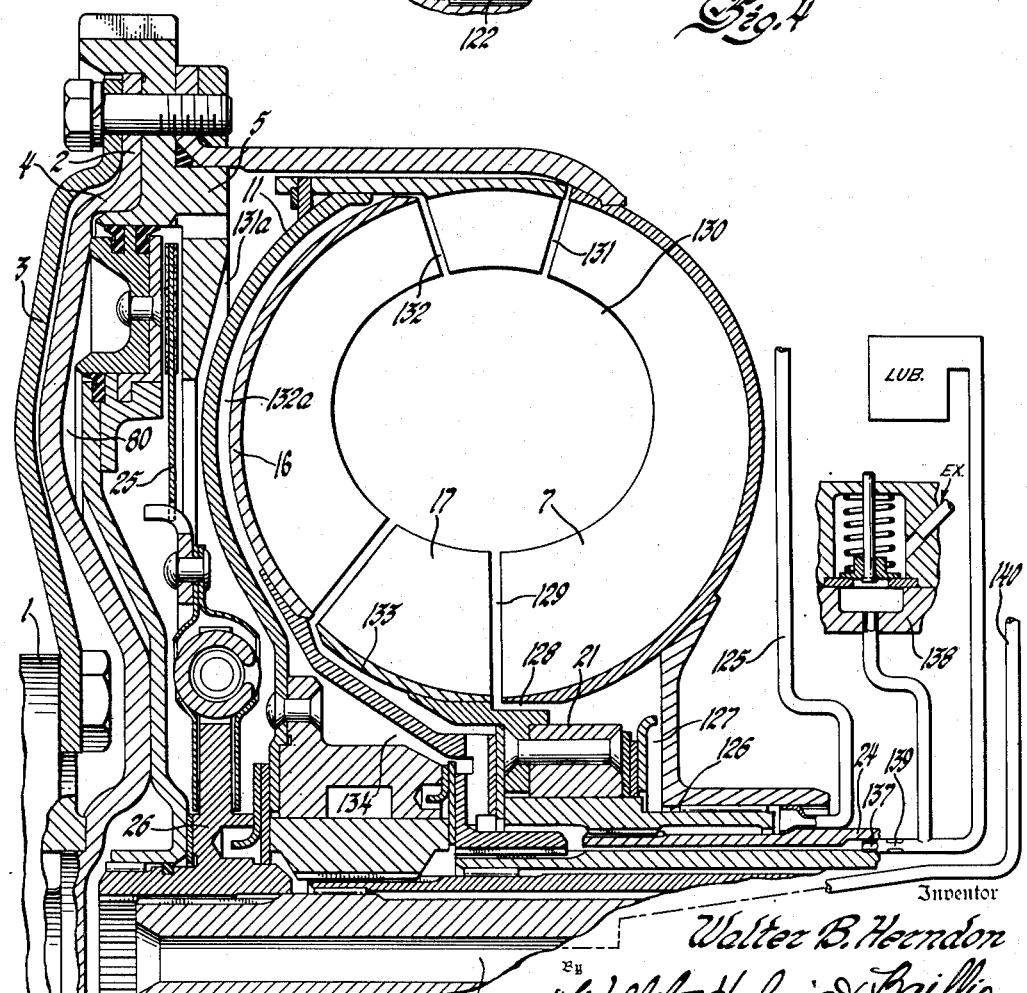
Figure 5 is a modification of the torque converter shown in Figure 1, illustrating fluid pressure inlet and outlet passages to and from the converter.

As shown in Figure 5, fluid under pressure may be admitted to the toroidal working chamber formed by the blades of the rotatable members of the torque converter by means of fluid pressure inlet pipe 125 communicating through passages 126, 127, 128 and space 129 intermediate impeller 7 and reaction member 17 with the central portion 130 of the converter. At the same time, this fluid under pressure passes through spaces 131 and 132 to opposite sides of rotor 11 (spaces 131a and 132a) and outwardly from the converter through passages 133 and 134, pipe 137 which pipe may constitute a lubrication feed passage for lubricating the transmission. A pressure relief valve 138 is used to regulate the pressure of lubrication feed at any desired pressure, such as, for example, twenty pounds per square inch. A restricted orifice 139 in outlet pipe 137 permits the pressure in the torque converter to be maintained at its desired pressure, such as, for example, eighty pounds per square inch. Input line 125 is connected through suitable piping (not shown) to the outlet of pumps P and Q of Figure 1.

Pipe 140 is connected to passage 74 so that fluid pressure may be admitted to cylinder 80 to apply direct drive clutch 25 as heretofore explained.

It will be apparent from the foregoing description of the invention that the construction is advantageous in that there are no transmission noises in "neutral" since there is no relative gear motion and that "reverse" may be obtained without by-passing the one-way low gear clutch 37, 38, 39, while making it possible to obtain both low reverse and second speed reverse ratio by the automatic upshift action of turbine members 11 and 16. A further advantage is that the arrangement permits a free towing of a disabled vehicle, whether or not slide gear 43 is meshed with teeth 41 of sleeve 36, and also permits connecting of the drive for starting a stalled engine by towing the vehicle in direct drive by engagement of clutch D or in a lower gear ratio by engagement of clutch K and actuation of clutch G. The pumps P and Q both provide fluid pressure for lubrication, for filling the converter working space, and for actuation of the three clutches. This pressure is, of course, available whenever either the engine shaft or output shaft is rotated.

The cone clutches and the multiple disc clutch shown are of the free-releasing and high-load type, permitting high torque capacity in a small space. The nested gear arrangement in combination with the plural converter turbines and one-way clutch is believed novel and of particular utility in obtaining automatic change of drive ratios without the need for external governors and equivalents. Since the point of ratio upshift from low to second involves inherent torque capacities of each of turbines 11 and 16 for a given range of torques, expressed as circulating velocity of the fluid body of the converter working space, and involves the net gear ratios of the connected gearing with respect to the vehicle load, there is particular merit in combining a double pair or nest of transmission input gears in the manner described. By this arrangement the nested parts may conveniently be placed beneath a flat floorboard in the driver's compartment while having a large portion of the transmission projecting thereunder.

Having described the preferred embodiment of this invention and possible modifications thereto, what is claimed is:

1. In a variable speed drive mechanism for connecting a power input shaft to a load shaft, a fluid turbine device having an impeller driven by said power shaft, a pair of torque-transmitting rotors, a reaction element, said turbine, rotors, and reaction element being bladed to form a working chamber for a circulating fluid body, a countershaft operatively connected to each of said rotors, and drive coupling for connecting said countershaft to said load shaft.

2. In a variable speed drive mechanism, a power input shaft, a load shaft, a fluid turbine device having an impeller driven by said power shaft and a pair of torque-transmitting rotors, a reaction element, said impeller reaction element and rotors being bladed to form a working chamber for a circulating fluid body, a countershaft operatively connected to one of said rotors, one-way clutch means connecting said countershaft to the other of said rotors, and drive coupling for connecting said countershaft to said load shaft.

3. In a variable speed drive mechanism, a power input shaft, a load shaft, a fluid turbine device having an impeller driven by said power shaft, a pair of torque-transmitting rotors and a reaction element bladed to form a working chamber for a circulating fluid body, a countershaft, gear means connecting one of said rotors to said countershaft, gear means connecting the other of said rotors to said countershaft, a one-way clutch intermediate one of said rotors and said countershaft, a one-way brake for preventing reverse rotation of said reaction member and for permitting forward rotation thereof, and gear means connecting said countershaft to said load shaft.

4. In a variable speed drive mechanism, a power input shaft, a load shaft, a fluid turbine device having an impeller driven by said power shaft and a plurality of rotors, said impeller and rotors being bladed to form a working chamber for a circulating fluid body, a countershaft operatively connected to said rotors, gear means connecting said countershaft to said load shaft, and a one-way clutch intermediate said gear means and said load shaft for establishing one-way drive between said shafts.

5. In a variable speed drive mechanism, a power input shaft, a load shaft, a fluid turbine device having an impeller driven by said power shaft, a pair of torque-transmitting rotors and a reaction member, said impellers, rotors, and reaction member being bladed to form a working chamber for a circulating fluid body, a countershaft operatively connected to said rotors, gear means connecting said countershaft and load shaft, a one-way clutch intermediate said gear means and said load shaft for establishing one-way drive between said last-mentioned shafts, and a second clutch operable to establish two-way drive between said countershaft and load shaft.

6. In a variable speed drive mechanism, a power input shaft, a load shaft, a fluid turbine device having an impeller driven by said power shaft and a pair of torque-transmitting rotors, said impeller and rotors being bladed to form a working chamber for a circulating fluid body, a countershaft operatively connected to each of said rotors, means connecting said countershaft to said load shaft, and clutch means for selectively connecting said engine shaft to said load shaft and rendering ineffective torque transmission through said turbine.

7. In a variable speed drive mechanism, a power shaft, a load shaft, a fluid turbine device having an impeller driven by said power shaft and a pair of torque-transmitting rotors, a hollow shaft having a gear affixed thereto, a second hollow shaft having a gear affixed thereto, means connecting each of said hollow shafts to one of said rotors, respectively, a countershaft, a pair of gears on said countershaft meshing with said afore-mentioned gears, respectively, an output gear on said countershaft, a sleeve member, said sleeve and said hollow shafts being concentric with respect to each other, gear means carried by said sleeve member meshing with said countershaft output gear, and means connecting said gear means to said load shaft.

8. In a variable speed drive mechanism, a power input shaft, a load shaft, a fluid turbine device having an impeller driven by said power shaft and a pair of torque-transmitting rotors, a hollow shaft driven by one of said rotors having a gear affixed thereto, a second hollow shaft driven by the other of said rotors having a gear affixed thereto, a countershaft, a pair of gears on said countershaft meshing with said afore-mentioned gears, respectively, an output gear on said countershaft, a sleeve member, said sleeve and said hollow shafts being concentric with respect to each other, a gear carried by said sleeve member meshing with said countershaft output gear, clutch means connecting said sleeve gear to said load shaft, and clutch means operable to selectively connect said power input shaft to said load shaft and rendering ineffective transmission of torque through said rotors.

9. In a variable speed drive mechanism, a power input shaft, a load shaft, a fluid turbine device having an impeller driven by said power shaft and a pair of torque-transmitting rotors, a first gear driven by one of said rotors, a second gear driven by the other of said rotors, a countershaft, a pair of gears on said countershaft meshing with said first and second gears, respectively, an output gear on said countershaft, a first sleeve, a gear carried by said sleeve meshing with said countershaft output gear, a one-way clutch connecting the gear carried by said first sleeve to said sleeve, gear teeth on said sleeve, a second sleeve, a second output gear on said countershaft, an idler gear meshing with said second countershaft output gear, a gear splined to said second sleeve, gear teeth on said gear, said gear being movable axially along said second sleeve and said idler gear for forward and reverse drive, respectively, of said load shaft, and means connecting said second sleeve to said load shaft.

10. In a vehicle drive mechansm, a power input shaft, a load shaft, a fluid turbine device having an impeller driven by said power shaft and a pair of torque-transmitting rotors, a first gear driven by one of said rotors, a second gear driven by the other of said rotors, a countershaft, a pair of gears on said countershaft meshing with said first and second gears, respectively, a countershaft output gear, a first sleeve, a gear carried by said sleeve meshing with said countershaft output gear, a one-way clutch for connecting said sleeve gear to said sleeve, gear teeth on said sleeve, a second sleeve, a second output gear on countershaft, an idler gear meshing with said second countershaft output gear, a gear splined to said second sleeve, said gear having one set of teeth adapted to mesh with said idler gear and a second set of teeth adapted to mesh with said first sleeve gear teeth, said gear being movable axially along said second sleeve for selectively engaging said first sleeve and idler gear for forward or reverse drive, respectively, of said load shaft, means connecting said second sleeve to said load shaft, and clutch means selectively operable for locking the first-mentioned sleeve gear to said first-mentioned sleeve for permitting two-way torque transmission between said first sleeve and said countershaft.

11. In a variable speed drive mechanism, a power input shaft, a load shaft, a fluid turbine device having an impeller driven by said power shaft and a pair of torque transmitting rotors, a first gear driven by one of said rotors, a second gear driven by the other of said rotors, a countershaft, a pair of gears on said countershaft meshing with said first and second gears respectively, a countershaft output gear, a first sleeve, a gear for rotating said sleve meshing with said countershaft output gear, gear teeth on said sleeve, a second sleeve, an idler gear, a second countershaft output gear meshing with said idler gear, a gear splined to said second sleeve, said gear having two sets of teeth thereon and being movable axially on said second sleeve for selective engagement with said first sleeve gear teeth and said idler gear, respectively, for forward or reverse rotation of said load shaft, and clutch means for selectively connecting and disconnecting said second sleeve to and from said load shaft.

12. In a variable speed drive mechanism, a power input shaft, a load shaft, a fluid turbine device having an impeller driven by said power shaft and a pair of torque-transmitting rotors, a first gear driven by one of said rotors, a second gear driven by the other of said rotors, a countershaft, a pair of gears on said countershaft meshing with said first and second gears, respectively, a countershaft output gear, a first sleeve, a gear for rotating said sleeve meshing with said countershaft output gear, gear teeth on said sleeve, a second sleeve, an idler gear, a second countershaft output gear meshing with said idler gear, a gear splined to said second sleeve, said gear having two sets of teeth thereon and being movable axially on said sleeve for selective engagement with said first sleeve gear teeth or with said idler gear, respectively, for forward or reverse rotation of said load shaft, clutch means for selectively connecting and disconnecting said load shaft to and from said sleeve, and additional clutch means for selectively connecting said power input shaft directly to said load shaft.

13. In a variable speed drive mechanism, a power input shaft, an intermediate drive shaft, a load shaft, a fluid turbine device having an impeller driven by said power shaft and a pair of torque-transmitting rotors, a first gear driven by one of said rotors, a second gear driven by the other of said rotors, a countershaft, a pair of gears on said countershaft meshing with said first and second gears, respectively, a countershaft output gear, gear means meshing with said countershaft output gear for rotating said intermediate shaft, a clutch drum housing splined to said intermediate shaft, and clutch means within said housing for selectively connecting and disconnecting said housing to and from said load shaft.

14. In a variable speed drive mechanism, a power input shaft, an intermediate drive shaft, a load shaft, a fluid turbine device having an impeller driven by said power shaft and a pair of torque transmitting rotors, a first gear driven by one of said rotors, a second gear driven by the other of said rotors, a countershaft, a pair of gears on said countershaft meshing with said first and second gears, respectively, a countershaft output gear, gear means meshing with said countershaft output gear for rotating said intermediate shaft, a clutch housing splined to said intermediate shaft and formed to provide a cylinder, a piston in said cylinder, a plurality of clutch plates carried by said piston, a clutch drum splined to said load shaft, and a plurality of clutch plates keyed to said clutch drum adapted to engage said first-mentioned clutch plates upon movement of said piston in said cylinder.

15. In a variable speed drive mechanism, a power input shaft, an intermediate drive shaft, a load shaft, a fluid turbine device having an impeller driven by said power shaft and a pair of torque-transmitting rotors, a first gear driven by one of said rotors, a second gear driven by the other of said rotors, a countershaft, a pair of gears on said countershaft meshing with said first and second gears, respectively, a countershaft output gear, a gear meshing with said countershaft output gear for rotating said intermediate shaft, a clutch housing splined to said intermediate shaft and formed to provide a cylinder, a piston in said cylinder, a plurality of inwardly extending clutch plates keyed to said piston, a clutch drum keyed to said load shaft, a plurality of outwardly facing clutch plates on said clutch drum adapted to engage said first-mentioned clutch plates, a stop-member carried by said clutch housing a spring intermediate said stop-member and piston normally urging said clutch plates into disengagement, and a ball member intermediate said piston and housing for transmitting reactive load on said piston to the outer set of said clutch plates upon engagement of the clutch plates.

16. In a variable speed drive mechanism, a power shaft, an intermediate drive shaft, a load shaft, a fluid turbine device having an impeller driven by said power shaft and a pair of torque transmitting rotors, a first gear driven by one of said rotors, a second gear driven by the other of said rotors, a countershaft having a pair of gears thereon meshing with said gears, respectively, a countershaft output gear, a sleeve splined to said intermediate shaft, a gear carried by said sleeve meshing with said countershaft output gear, a one-way clutch intermediate said sleeve gear and said sleeve for establishing one-way drive between said countershaft and intermediate shaft, a clutch housing splined to said intermediate shaft and formed to provide a pair of cylinders, an extension on said sleeve gear, a piston in one of said cylinders having an extension adapted to engage said sleeve extension, said extensions locking said gear to said housing upon mutual engagement thereof for establishing two-way drive between said countershaft and intermediate shaft, a piston in the other of said cylinders, clutch plates carried by said piston, a clutch drum splined to said load shaft, clutch plates keyed to said clutch drums adapted to engage said piston clutch plates, spring means for normally disengaging said clutch plates, and a reactive member intermediate said piston and housing for transferring reactive forces applied to said piston upon engagement of said clutch plates to the outer set of said clutch plates.

17. A fluid torque converter comprising a plurality of independently rotatable bladed members, the blades of said members forming a toroidal working space for enclosing a circulating fluid body, said space having radial inflow and outflow zones and inner and outer axial zones bridging said radial zones, said converter consisting of an impeller member having its blades positioned in said outflow zone, a first turbine member occupying said outer bridging zone, a second turbine member having its blades positioned in said radial inflow zone, a reaction member occupying said inner bridging zone, a gear unit adapted to connect said turbine members to a load shaft through plural torque paths, said gear unit including a countershaft cluster gear and torque transmitting gears driven by said first and second turbine members, respectively, meshed with mating gears of said cluster.

18. A fluid torque converter comprising a plurality of independently rotatable bladed members, the blades of said members forming a toroidal working space for enclosing a circulating fluid body, said space having radial inflow and outflow zones and inner and outer axial zones bridging said radial zones, said converter consisting of an impeller member having its blades positioned in said outflow zone, a first turbine member occupying said outer bridging zone, a second turbine member having its blades positioned in said radial inflow zone, a reaction member occupying said inner bridging zone, a gear unit adapted to connect said turbine members to a load shaft through plural torque paths, said gear unit including a countershaft cluster gear, torque transmitting gears driven by said first and second turbine members, respectively, meshed with the mating gears of said cluster and a countershaft output gear meshing with an input gear for driving said load shaft, and clutch means for selectively connecting and disconnecting said load shaft to and from said countershaft output gear.

19. In a variable speed drive mechanism, a torque converter comprising a plurality of independently rotatable bladed members, the blades of said members forming a toroidal working space for enclosing a circulating fluid body, said space having radial inflow and outflow zones and inner and outer axial zones bridging said radial zones, said converter including an impeller member having blades positioned in said outflow zone, a first turbine member having blades occupying said outer bridging zone, a second turbine member having blades positioned in said inflow zone and a reaction member having blades positioned in said inner bridging zone, a gear driven by said first turbine, a gear driven by said second turbine member, a countershaft, and a pair of gears fixed to said countershaft, said last-mentioned gears being in constant mesh, respectively, with the gears driven by said first and second turbine members.

WALTER B. HERNDON.

REFERENCES CITED

The following references are of record in the file of this patent:

UNITED STATES PATENTS

| Number | Name | Date |
|---|---|---|
| 2,055,895 | Fawcett | Sept. 29, 1936 |
| 2,235,370 | Jandasek | Mar. 18, 1941 |
| 2,260,015 | Fichtner | Oct. 21, 1941 |
| 2,280,015 | Tipton | Apr. 14, 1942 |
| 2,292,384 | Lysholm | Aug. 11, 1942 |
| 2,308,547 | Schneider | Jan. 19, 1943 |
| 2,316,390 | Biermann | Apr. 13, 1943 |
| 2,317,498 | Tipton | Apr. 27, 1943 |
| 2,321,672 | Hall et al. | June 15, 1943 |
| 2,326,994 | Duffield | Aug. 17, 1943 |
| 2,383,980 | Lysholm | Sept. 4, 1945 |
| 2,397,368 | Pennington | Mar. 26, 1946 |
| 2,402,164 | Kelbel | June 18, 1946 |
| 2,408,008 | Tipton | Sept. 24, 1946 |
| 2,433,052 | Kelley | Dec. 23, 1947 |
| 2,466,206 | Carnagua | Apr. 5, 1949 |
| 2,480,938 | Lapsley | Sept. 6, 1949 |
| 2,514,963 | McRae | July 11, 1950 |
| 2,529,400 | Lapsley | Nov. 7, 1950 |